United States Patent
Chou et al.

(10) Patent No.: US 6,839,253 B2
(45) Date of Patent: Jan. 4, 2005

(54) MULTI-PERIOD CYCLE-ALTERNATIVE SWITCHING MODE POWER SUPPLY CONTROL DEVICE

(75) Inventors: Chin-Wen Chou, Hsin-Tien (TW); Eddie Cheng, Hsin-Tien (TW); Bart Chin-Biau Chung, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 29 days.

(21) Appl. No.: 10/359,128

(22) Filed: Feb. 6, 2003

(65) Prior Publication Data

US 2004/0156218 A1 Aug. 12, 2004

(51) Int. Cl.[7] .............................................. H02M 7/00
(52) U.S. Cl. ......................................... 363/84; 363/95
(58) Field of Search .............................. 363/88, 74, 78, 363/84, 85, 86, 87, 89, 95, 96, 97, 98

(56) References Cited

U.S. PATENT DOCUMENTS

| | | | | |
|---|---|---|---|---|
| 4,445,049 A | * | 4/1984 | Steigerwald | ................. 307/45 |
| 4,499,534 A | * | 2/1985 | Schnetzka et al. | .......... 363/129 |
| 4,591,963 A | * | 5/1986 | Retotar | ......................... 363/17 |
| 4,642,745 A | * | 2/1987 | Steigerwald et al. | .......... 363/37 |
| 4,882,664 A | * | 11/1989 | Pennington | ................... 363/41 |
| 5,235,504 A | * | 8/1993 | Sood | ........................... 363/53 |
| 5,477,132 A | * | 12/1995 | Canter et al. | ................ 323/282 |
| 6,151,226 A | * | 11/2000 | Chen et al. | .................... 363/26 |
| 6,307,765 B1 | * | 10/2001 | Choi | ........................... 363/134 |
| 6,690,591 B2 | * | 2/2004 | Min | .............................. 363/97 |

\* cited by examiner

Primary Examiner—Jeffrey Sterrett
(74) Attorney, Agent, or Firm—Birch, Stewart, Kolasch & Birch, LLP.

(57) ABSTRACT

The present invention discloses to a multi-period cycle-alternative switching mode power supply control device, comprising: a power transfer control unit, a dimming bias control, a burst timing control, and a steering logic; wherein said device has a variable multi-period control cycle to effectively control certain power transfer elements of specific nature and assure those elements and the loading at the rear end can operate more efficiently in a reliable range of specific nature.

8 Claims, 7 Drawing Sheets

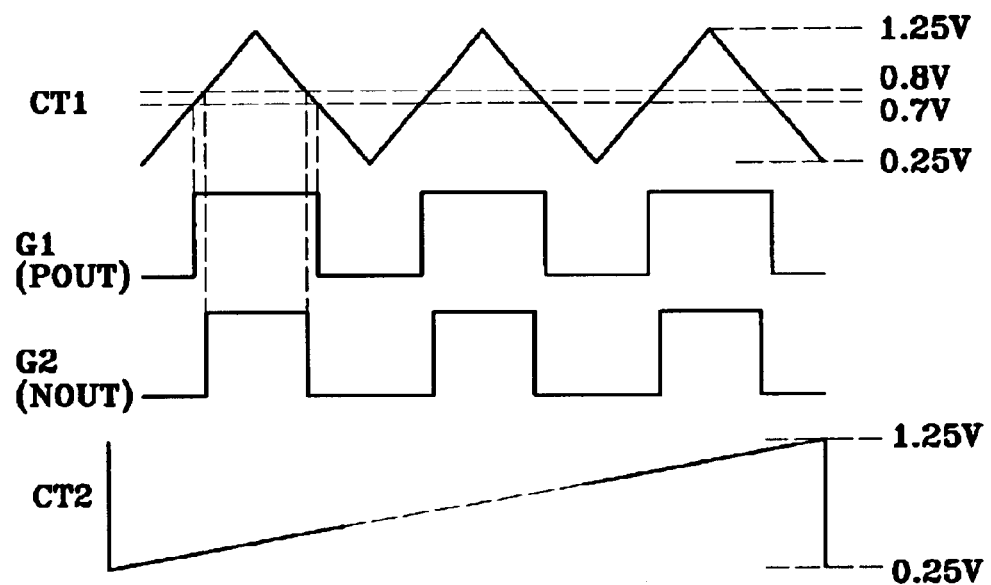
PRIOR ART Fig.6

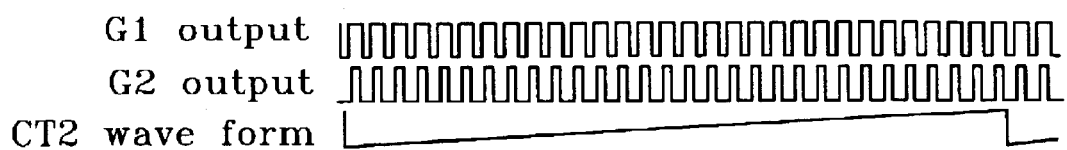
PRIOR ART Fig.7A
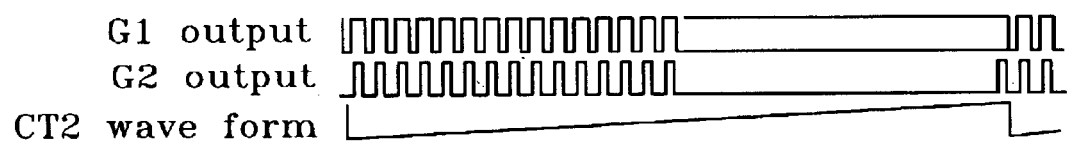
PRIOR ART Fig.7B
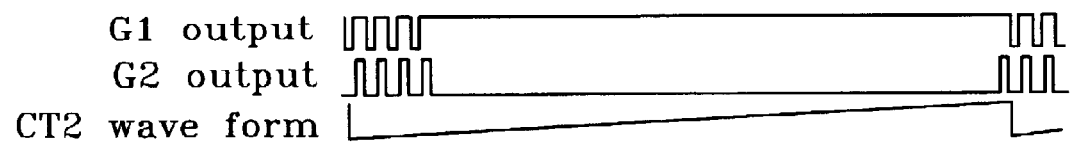
PRIOR ART Fig.7C

MULTI-PERIOD CYCLE-ALTERNATIVE SWITCHING MODE POWER SUPPLY CONTROL DEVICE

FIELD OF INVENTION

The present invention relates to a multi-period cycle-alternative switching mode power supply control device, more particularly to a power supply controller having a variable multi-period control cycle to effectively control certain power transfer elements of specific nature and assure those elements and the loading at the rear end can operate more efficiently in a reliable range of specific nature.

BACKGROUND OF THE INVENTION

The prior-art switching power supply controller is a controller primarily using the normal rate and variable frequency for the control as shown in FIG. 6. The charge and discharge of electricity of each oscillated circuit are set by means of connecting the resistor to the RT terminal, of which the RT terminal is connected to the FB terminal through the resistor to provide (controlled by light) a control frequency. CT1 is connected to the output terminal of the oscillated circuit of a capacitor, and capable of generating a trigonometric wave oscillation between the lower limit LL and the upper limit UL by means of the current at RT terminal. CT2 is connected to the terminal of a capacitor to generate and provide a serrated wave to enable 1/20 of the current at the CR1 terminal to pass and produce serrated wave oscillations between the lower limit and upper limit. However, the method described above is not necessarily a good method for certain power transfer elements, particularly to those power transfer elements having the property of a bandpass filter; a change of the input frequency may result in a change of output voltage, but a great deal of input power is absorbed by such power transfer elements. Therefore a long time use may break down such elements or expedite their aging, and thus affecting the reliability of the whole system.

Furthermore, if the output end requires a dimming, a burst timing circuit is generally used to intermittently transfer the output power (as shown in FIGS. 7-1 to 7-3), and the power transfer element varies the power or voltage and sends the power to the loading element. However, such method has a substantial shortcoming, because the intermittent ON/OFF will transiently impact the power transfer element (from zero power to maximum power) and will also cause such element to produce audible noise.

SUMMARY OF THE INVENTION

The primary objective of the present invention is to overcome the shortcomings and avoid the deficiencies of the prior art by providing a standby mode function during the off cycle, which greatly improves the regulation control range of the original system, and maintains an overall action of the power transfer element. Therefore the audible noise can be suppressed. Each of the ON and OFF cycles provides different power transfer, and also effectively excites the loading terminal, so that the system performance of the power transfer element and the device at the loading terminal can be controlled effectively, and thus making the product more reliable and efficient.

To accomplish the aforementioned purpose, the multi-period alternative-cycle switching power supply control device of the present invention comprises a power transfer control, a dimming bias control, a burst timing control, and a steering logic; wherein said device has a variable multi-period control cycle to effectively control certain power transfer elements of specific nature and assure those elements and the loading at the rear end can operate more efficiently in a reliable range of specific nature.

BRIEF DESCRIPTION OF THE DRAWINGS

FIG. 6 is an illustrative diagram of the traditional adjusting light timing waveform.

FIG. 7A is an illustrative diagram of the prior-art timing under the control of power intensity of 100% of the light source and a burst cycle of about 120 Hz per second.

FIG. 7B is an illustrative diagram of the power transfer according to FIG. 7A while it is not operating, and in 50% of the total suspending state.

FIG. 7C is an illustrative diagram of 10% of the power transfer according to FIG. 7A while the power transfer element is not operating, and in 90% of the total suspending state.

DETAILED DESCRIPTION OF THE PREFERRED EMBODIMENTS

To make it easier for our examiner to understand the objective of the invention, its structure, innovative features, and its performance, we use a preferred embodiment together with the attached drawings for the detailed description of the invention.

Figure 1:
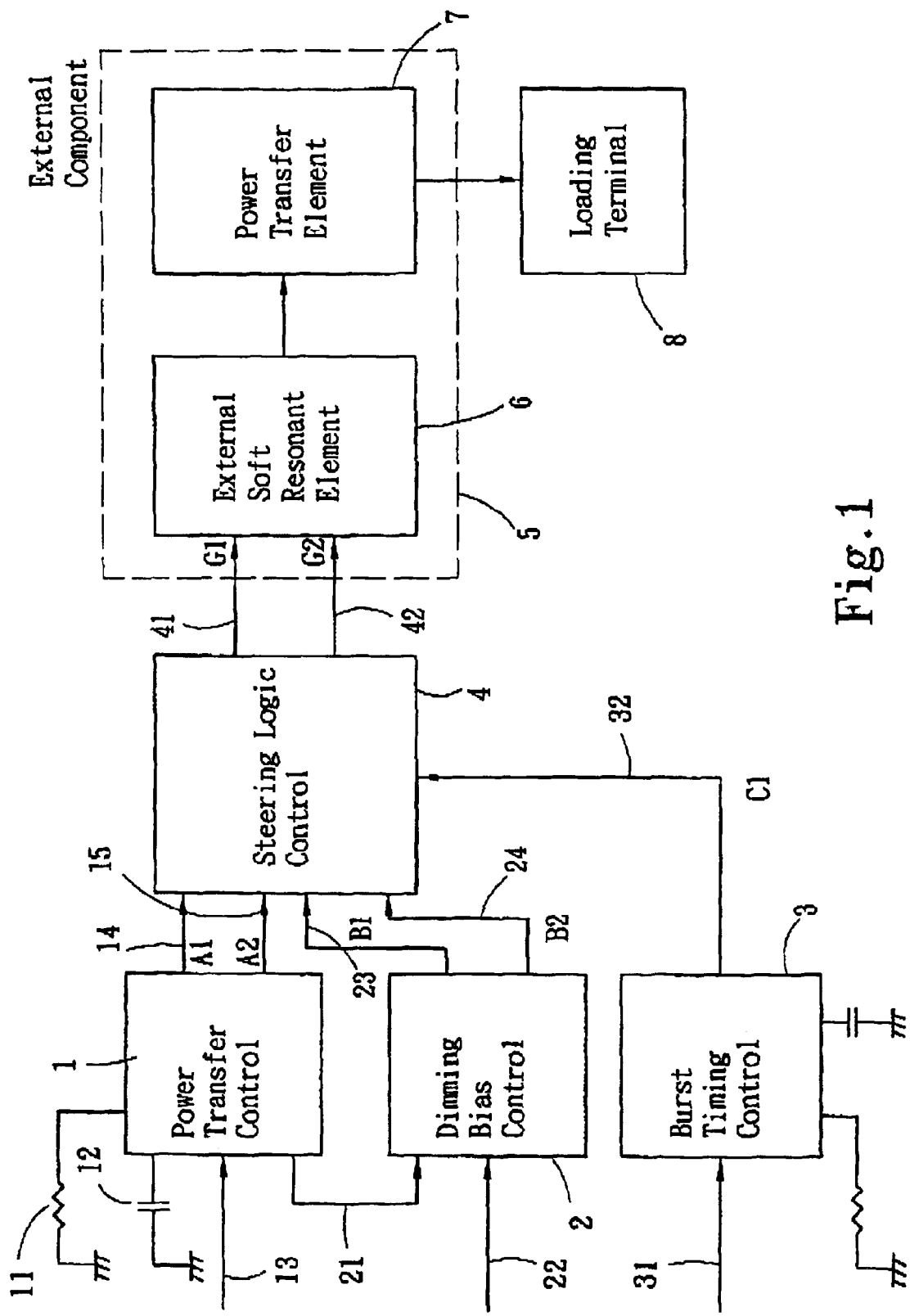
FIG. 1 is a block diagram of the present invention.
Figure 2:
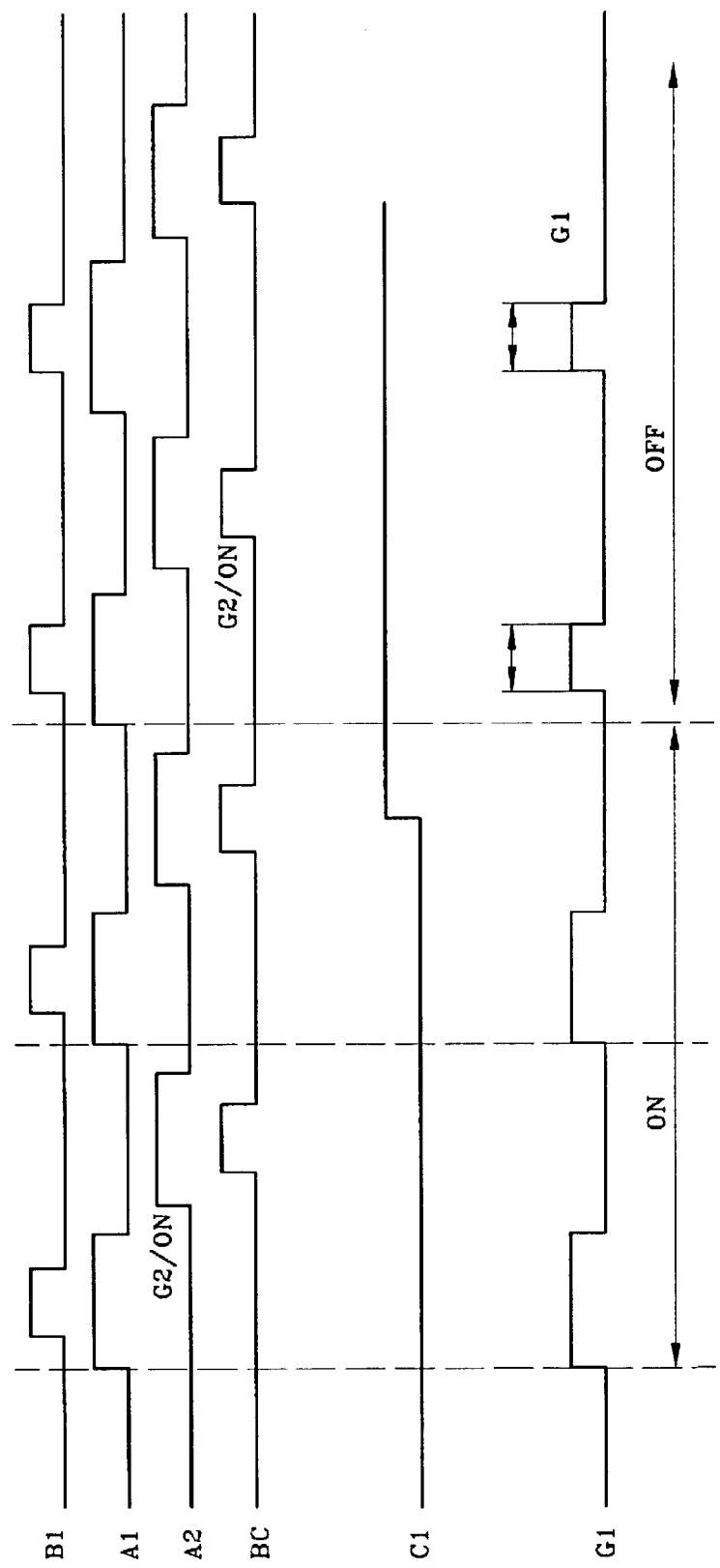
FIG. 2 is an illustrative diagram of timing waveform of FIG. 1.
Figure 3:
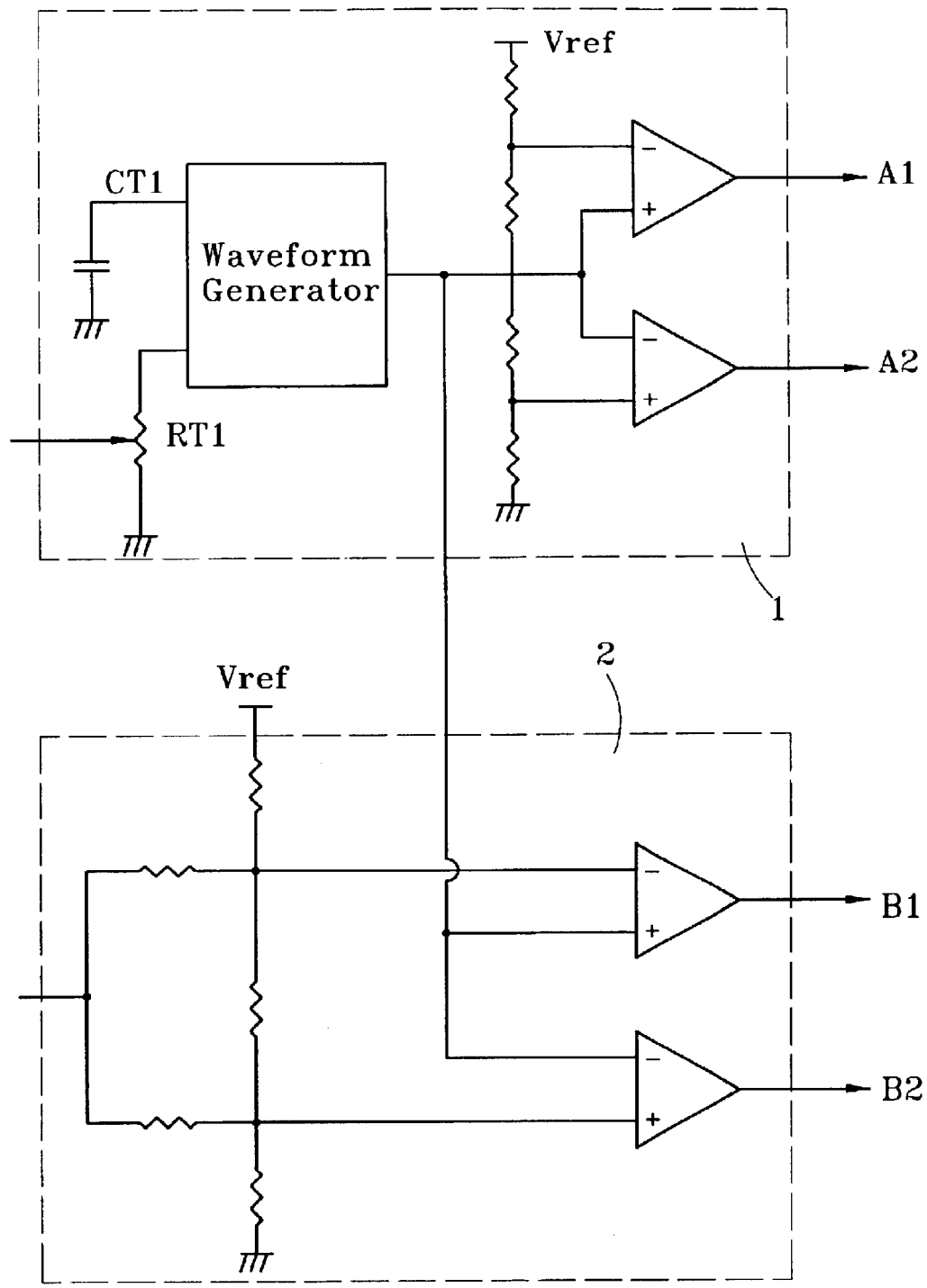
FIG. 3 is a schematic diagram of a power transfer control and dimming bias control circuits of the present invention.
Figure 4:
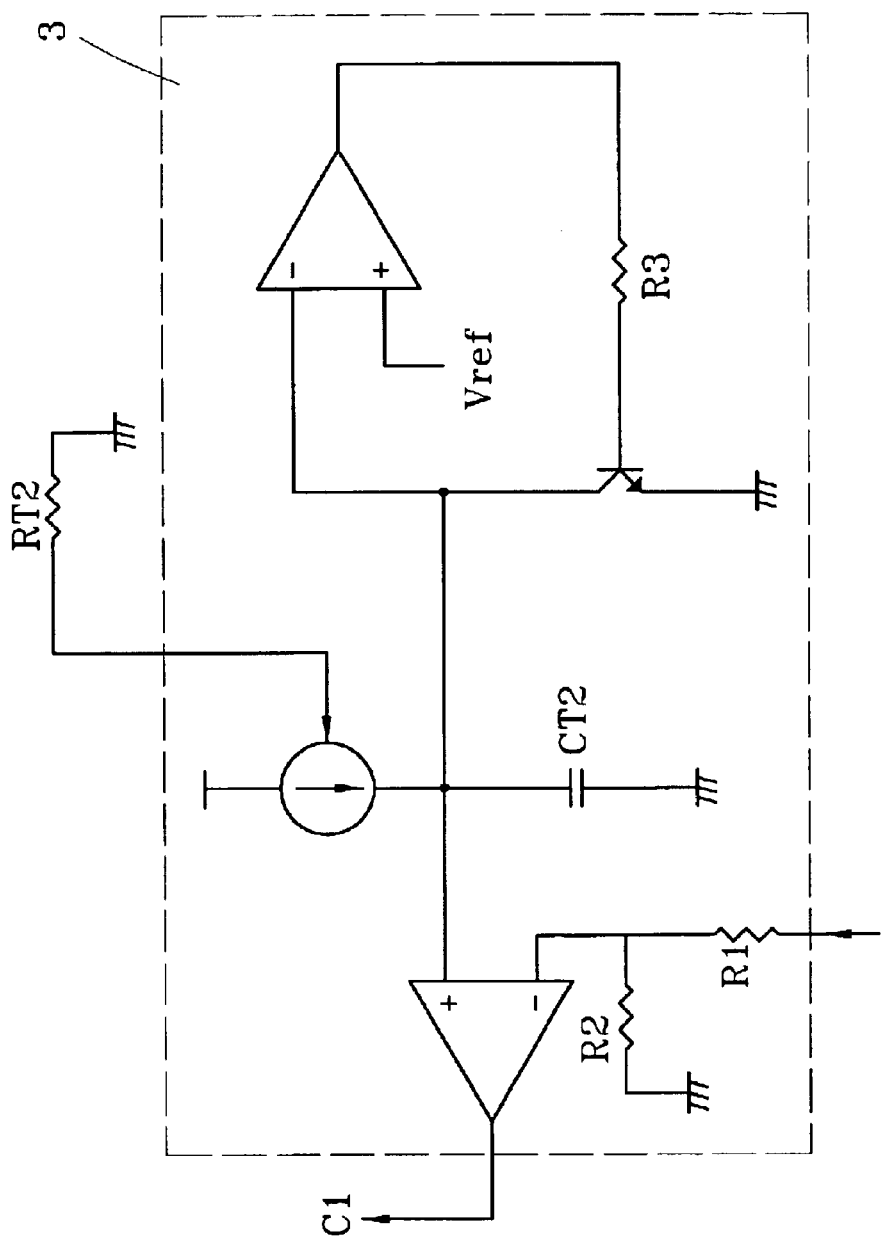
FIG. 4 is an illustrative diagram of a burst timing control circuit of FIG. 1.
Figure 5:
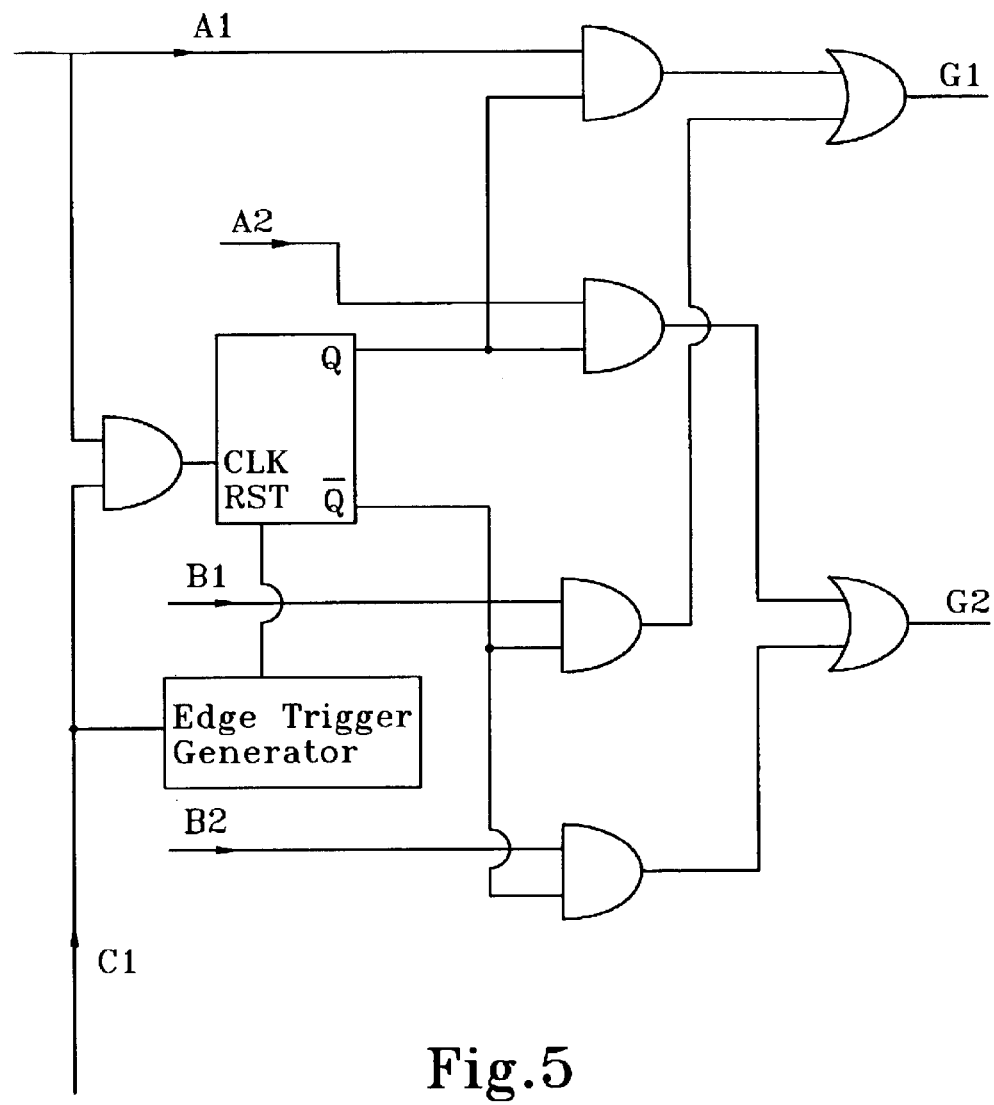
FIG. 5 is an illustrative diagram of a steering logic control circuit of FIG. 1.

Please refer to FIGS. 1 to 5 for the present invention, the timing waveform of FIG. 1, and the schematic circuit of FIG. 1. As shown in the figures, the multi-period cycle-alternative switching mode power supply control device having a variable multi-period control cycle to effectively control certain power transfer elements of specific nature and assure those elements and the loading at the rear end can operate more efficiently in a reliable range of specific nature; said device comprises a power transfer control unit 1, a dimming bias control 2, a burst timing control 3, and a steering logic 4; wherein said power transfer control 1 is comprised of a resistor 11 and a capacitor 12 to constitute a determinant element for setting the operating frequency point, and the input terminal 13 of the power transfer control 1 inputs an error signal, and the feedback error signal is used to adjust the duty width, and further obtained the adjusted signals A1, A2 at the output terminals 14, 15 of the power transfer control 1. The two control output signals with different timing relation are sent to the steering logic circuit.

One input end 21 of the dimming bias control 2 is connected to another output end of said power transfer control 1. The timing signal generated by the power transfer control 1 is used as a reference source, while another input terminal 22 of the dimming bias control 2 inputs an electric potential of an error signal to change the timing relation of the reference timing signal, and thus obtain another set of control timing B1, B2. Said control timing B1, B2 is outputted from the output terminal 23, 24 of the dimming bias control 2 to said steering logic control 4.

The burst timing control 3 is comprised of a set of rising trigonometric wave circuits, while there is a dimming ADJ signal at the input terminal 31 for comparing with said rising trigonometric wave circuits, and further to obtain a ON/Off (High/Low) control timing C1. Said timing C1 is used to allocate said adjusted signals A1, A2 and output the timing of the control timing B1, B2 to the timing relation of the output terminal 41, 42 of the steering logic control 4.

The steering logic control 4 sends the adjusted signal A1, A2 outputted form the power transfer control 1, the control timing B1, B2 outputted from the dimming bias control 2, and the timing C1 outputted by the burst timing control 3 in sequence to the ON/OFF signal at the output terminal 32 of the burst timing control 3, and is separated in different timing according to the sequence, and thus controlling the external component 5, including the external soft resonant element 6 to perform an appropriate power waveform transfer, and sending the power waveform (close to the sine wave) to the power transfer element 7. The signal after the transfer (step-up or step-down signal) is sent to the loading terminal 8 (such as a lamp or a rectification circuit.

If the output power needs to change, the frequency is not changed, but the duty width is changed, because the frequency remains unchanged. Therefore the power transfer element having the property of bandpass filter can work at the most efficient point. Since the duty width is changed, it outputs via a soft switching component to obtain a voltage waveform with smaller amplitude. Since the voltage at the loading terminal is changed, the regulation controlling function is achieved. Furthermore, a set of dimming control period unit is added; when the dimming control is performed, the ON cycle is kept by the frequency and width of the width control, but the OFF cycle is controlled by the dimming control by adding the average power of the ON cycle and the OFF cycle to the adjusted input terminal to adjust the width of another cycle during the OFF cycle. Such width is basically much smaller than that of the ON cycle, but the average still gives a dimming effect without any intermittent interrupt.

Since the present invention provides a standby mode function in the OFF cycle, it greatly improves the regulation control range of the original system and maintains an overall action of the power transfer element. Therefore the audible noise can be suppressed. Each of the ON and OFF cycles provides different power transfer, and also effectively excites the loading terminal, so that the system performance of the power transfer element and the device at the loading terminal can be controlled effectively, and thus making the product more reliable and efficient.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-period cycle-alternate switching mode power supply control device, having a variable multi-period control cycle to effectively control certain power transfer elements of specific nature and assure such element and the loading at its rear end can operate more efficiently in a reliable range of specific nature, said device comprising:

a power transfer control, having an input terminal, and said input terminal inputting an error signal, and using the error signal to adjust a duty width and obtain an adjusted signal at an output terminal;

a dimming bias control, having one input terminal coupled to an output terminal of said power transfer control, and using a timing signal generated by said power transfer control as a reference source, while using another input of said dimming bias control to input an electric potential of an error signal and change the timing relation of the timing signal, and obtaining a set of control timing;

a burst timing control, having an input terminal, and said input terminal having a dimming control input signal for comparing with a waveform signal generated by said burst timing control, and obtain a high/low control timing; and a steering logic control, sending an adjusted signal outputted from said power transfer control, a control timing outputted from said dimming bias control, and a timing outputted by said burst timing control in sequence to an ON/OFF signal at an output terminal of said burst timing control and being separated in different timing according to the sequence, and thus controlling an external component and then sending to a loading terminal after being processed trough said external component to control the action of the element at the loading terminal.

2. The multi-period cycle-alternate switching mode power supply control device of claim 1, wherein said power transfer control comprises a resistor and a capacitor mutually coupled to constitute a determinant element for setting the working frequency point.

3. The multi-period cycle-alternate switching mode power supply control device of claim 1, wherein said burst timing control is a set of rising trigonometric wave circuit.

4. The multi-period cycle-alternate switching mode power supply control device of claim 1, wherein said loading terminal is a lamp.

5. The multi-period cycle-alternate switching mode power supply control device of claim 1, wherein said loading terminal is a rectification circuit.

6. The multi-period cycle-alternate switching mode power supply control device of claim 1, wherein said external element comprises an external soft resonant element and a power transfer element.

7. The multi-period cycle-alternate switching mode power supply control device of claim 6, wherein said steering logic control outputs a signal to control the external soft resonant element for an appropriate power waveform transfer, and the power waveform is sent to said transfer element for transferring the signals and then to the loading terminal.

8. The multi-period cycle-alternate switching mode power supply control device of claim 1, wherein said power transfer control having a property of bandpass filter works at the most efficient point, and obtains a voltage waveform of a smaller amplitude through said output soft control element due to the change of width, and obtains a regulation control function due to the change of voltage at the loading terminal.

* * * * *